Patented May 30, 1950

2,509,838

UNITED STATES PATENT OFFICE 2,509,838

MANUFACTURE OF TUNGSTEN AND MOLYBDENUM CARBIDES AND SINTERED ALLOYS

Marcel Oswald, Paris, France, assignor to Societe Le Carbone-Lorraine, Paris, France No Drawing. Application October 20, 1947, Serial No. 780,999. In France August 4, 1941

Section 1, Public Law 690, August 8, 1946
Patent expires August 4, 1961

4 Claims. (Cl. 75—137)

The process which forms the subject of this invention consists in preparing a pulverulent nitride of tungsten or molybdenum and carburising the product in the presence of auxiliary metal (cobalt) in powder form and then sintering. This process presents the technical and economical advantages explained hereunder.

In practice, the starting point is an oxide of tungsten or an oxide of molybdenum of suitable fineness, and preferably passing entirely through a sieve of 10,000 meshes per square centimetre. The selected oxide is heated in a current of anhydrous ammonia gas which effects both the reduction and the nitriding. The nitride is obtained in very fine powder form; it is mixed with carbon in calculated quantity, after which the carburisation is carried out.

The nitriding can be carried out at a temperature of between about 450 and 800° C. The lowest temperatures yield finer products, but the reduction speed becomes sometimes too low for industrial working. In the case of oxide of tungsten, it has been found that an optimum temperature lies within approximately 600 and 750° C. The operation is much more rapid at the higher temperature, as will be seen from the fact that it is possible, for instance, to treat several kilograms at 750° C. in a period of about four hours, whereas the treatment of only one kilogram at 700° C. requires from two to three hours. The tungsten nitride obtained is extremely fine, black in colour, similar to very good lamp blacks; it passes entirely through a No. 350 sieve. In order to nitride molybdenum, the temperatures and modes of preparation differ very little. The nitriding of molybdenum is easier, whilst, on the other hand, the reduction of the oxides is more difficult; practically, these compensate each other and the temperatures to be chosen remain exactly of the same order as in the case of tungsten oxides.

In all these cases, the treatment by ammonia can be carried out in a tubular furnace with the ammonia gas entering one end of the furnace and the reaction gases being discharged at the opposite end. The apparatus can be operated discontinuously, that is to say, that the material in the furnace can be allowed to cool after it has been nitrided and then removed, after which a further operation is started. It is preferable, however, to operate continuously, the oxidised powder moving from one end of the tube to the opposite end and in the opposite direction to the flow of the ammonia.

For the purpose of carburising, it is sufficient to mix the nitride with the calculated quantity of very fine and pure carbon, such, for instance, as lamp black or sugar carbon, and then heat it at a temperature of between about 1200 and 1500° C. in a current of dry hydrogen, or in a neutral or reducing atmosphere, or alternatively in vacuo. In order to prepare the tungsten carbide, it is preferable to operate at a temperature of about 1350° C. and in vacuo, as this produces an extremely fine carbide. The treatment in vacuo avoids the disadvantage of any accidental overheating. The carbide grains then grow less than when carburised in the presence of hydrogen.

Whatever the process adopted may be, the nitrogen of the nitride is released in an elementary state between a temperature of about 1000 and 1200° C. The nascent metal becomes very easily carburised. In the case of molybdenum, the carburisation can be carried out between 1200 and 1400° C., the best temperature being of the order of from 1200 to 1300° C.

Whatever the carbide to be prepared may be, the desired quantity of carbon can be incorporated at will. For instance, when dealing with tungsten, it is possible to prepare the carbide WC containing 6.12% of carbon or the carbide $W_2C$ with 3.15% of carbon, or their mixtures in any proportions.

Carbides so prepared can be used by mixing with the requisite quantity of metal or auxiliary alloy (for instance, cobalt or cobalt and iron) and then by pressing and sintering according to the well-known technical methods for producing sintered hard alloys.

The invention, however, comprises a new technical process which starts from reducible oxide of the auxiliary metal serving as binder in the sintered alloy. The oxide is mixed with the tungsten or molybdenum oxide chosen and the reduction is effected by ammonia on the aggregate, thus also reducing the auxiliary metal oxide to the metallic state, but the nitriding and then the carburisation affect only the tungsten or the molybdenum which alone is nitrided and then carburised. This process makes it possible to reduce the number of necessary operations and the use of oxides facilitates the production of a much more intimate mixture of the starting constituents. This intimate mixture subsists between the pulverulent carbide and the reduced auxiliary metal when all the operations are completed.

Another advantage of this process is that it lowers the temperature required for the carburisation. In fact it is possible to carburise at a temperature of 1150–1200° C. mixtures of tungsten nitride and of a small quantity of cobalt intended, for instance, to prepare alloys of a content of 3 to 10% of cobalt for 97 to 90% of tungsten carbide.

The chief advantages of the invention are as follows: the hydrogen usually employed to reduce the tungsten or molybdenum oxides is dangerous, because it is highly combustible and yields mixtures which are explosive in air. Leakages in apparatus are difficult to detect. If compressed hydrogen is used, numerous containers subjected to pressures approaching 200 kilos per square centimetre are required. The use of ammonia allows substantial economies in the storage. The liquid ammonia containers have only to stand much lower pressures. With containers of equal capacity, the quantity of ammonia very much exceeds the quantity of compressed hydrogen so that the manipulations are much less numerous and dangerous in the case of liquified ammonia. In case of any escape, the ammonia is at once detected by its smell and long before the explosive concentration has been reached (about 16%).

The use of ammonia as a reducer economizes hydrogen because a smaller quantity of it is required to reduce a particular oxide at a given temperature, when the hydrogen is in the atomic state due to the pyrolysis of the ammonia. If it be desired to obtain very fine powders by reducing the oxide with hydrogen, a considerable excess of the gas is necessary, which excess is generally wasted. Ammonia which becomes decomposed in atomic hydrogen and nitrogen, makes it possible to reduce the tungsten or molybdenum oxide irreversibly and supplies a finer nascent metal than reduction by molecular hydrogen. On the other hand, the irreversible nitriding of the nascent metal also prevents the growth of the grains. Such growth could only occur in the course of the following carburisation and sintering operations, which operations are common to both the processes compared.

The carburisation, starting from the nitrides, can be carried out at much lower temperatures than when starting from the reduced metals. The growth of the grains during the carburisation is less probable with the ammonia process. Finally, this process results in finer carbides and the corresponding sintered alloys are harder and more resistant to wear, when used for cutting tools or dies.

The invention furthermore avoids the necessity of crushing for a considerable length of time mixtures of hard material (tungsten or molybdenum carbide) and of auxiliary metal (cobalt), inasmuch as a satisfactory fineness is at once obtained. This results, therefore in a saving of time and material, as hard carbides are very abrasive for the surfaces of the crushers.

The process based on nitrides consequently makes it possible to prepare sintered alloys with remarkably fine carbide grains which are very resistant to all causes of wear.

I shall characterise with a few figures the structures obtained in the case of a composition of tungsten carbide with 6% of cobalt. There is practically a billion crystals of tungsten carbide per cubic millimetre, the individual dimensions of these crystals falling within the limits of 0.2 and 6 microns, but most crystals are at most equal to 1 micron.

When a mixture of a reducible compound of the cobalt and the tungsten oxide is subjected to the operations of reduction, nitriding, carburisation and sintering, the average size of the grains is further decreased, there being about 1.5 to 2 billion crystals of carbide per cubic millimetre of alloy.

I claim:

1. The manufacture of a hard metal carbide product consisting of metallic cobalt and carbide of one metal selected from the group consisting of tungsten and molybdenum, which comprises forming an intimate powder mixture of oxide of said selected metal with cobalt oxide, heating said mixture at a temperature between about 450° C. and about 800° C. in an atmosphere of anhydrous ammonia gas and in the absence of carbon to thereby obtain an intimate powder mixture containing metallic cobalt and a nitrided product of said selected metal, heating the powder mixture thus obtained with carbon at a temperature between about 1150° C. and about 1250° C. to form an intimate powder mixture of metallic cobalt and carbide of said selected metal.

2. The manufacture of a hard metal carbide product consisting of metallic cobalt and carbide of one metal selected from the group consisting of tungsten and molybdenum, which comprises forming an intimate powder mixture of oxide of said selected metal with cobalt oxide, heating said mixture at a temperature between about 600° C. and about 750° C. in an atmosphere of anhydrous ammonia gas and in the absence of carbon to thereby obtain an intimate powder mixture containing metallic cobalt and a nitrided product of said selected metal, heating the powder mixture thus obtained with carbon in vacuo at a temperature between about 1150° C. and about 1250° C. to form an intimate powder mixture of metallic cobalt and carbide of said selected metal.

3. The manufacture of a hard metal carbide product consisting of metallic cobalt and carbide of one metal selected from the group consisting of tungsten and molybdenum, which comprises forming an intimate powder mixture of oxide of said selected metal with cobalt oxide, heating said mixture at a temperature between about 450° C. and about 800° C. in an atmosphere of anhydrous ammonia gas and in the absence of carbon to thereby obtain an intimate powder mixture containing metallic cobalt and a nitrided product of said selected metal, mixing the mixture thus obtained with carbon sufficient to saturate and transform the entire content of said selected metal in said last-mentioned mixture into carbide, and heating the resultant mixture at a temperature between about 1150° C. and about 1250° C. to produce an intimate powder mixture of metallic cobalt and carbide of said selected metal.

4. The manufacture of a hard metal carbide product consisting of metallic cobalt and carbide of one metal selected from the group consisting of tungsten and molybdenum, which comprises forming an intimate powder mixture of oxide of said selected metal with cobalt oxide, heating said mixture at a temperature between about 600° C. and about 750° C. in an atmosphere of anhydrous ammonia gas and in the absence of carbon to thereby obtain an intimate powder mixture containing metallic cobalt and a nitrided product of said selected metal, mixing the mixture thus obtained with carbon sufficient to saturate and transform the entire content of said selected metal in said last-mentioned mixture into carbide, and heating the resultant mixture in vacuo at a temperature between about 1150° C. and about 1250° C. to produce an intimate powder mixture of metallic cobalt and carbide of said selected metal.

MARCEL OSWALD.

REFERENCES CITED

The following references are of record in the file of this patent:

UNITED STATES PATENTS

| Number | Name | Date |
| --- | --- | --- |
| 1,874,641 | Sessions | Aug. 30, 1932 |
| 2,044,853 | Laise | June 23, 1936 |
| 2,160,670 | Oswald | May 30, 1939 |
| 2,170,433 | Schwarzkopf | Aug. 22, 1939 |
| 2,171,391 | Boecker | Aug. 29, 1939 |
| 2,202,821 | Balke | June 4, 1940 |
| 2,246,387 | Schwarzkopf | June 17, 1941 |
| 2,289,104 | Dawihl et al. | July 7, 1942 |

FOREIGN PATENTS

| Number | Country | Date |
| --- | --- | --- |
| 452,411 | Great Britain | Aug. 19, 1936 |